United States Patent
Zhang et al.

(10) Patent No.: US 9,826,505 B2
(45) Date of Patent: Nov. 21, 2017

(54) IPV4 AND IPV6 SUPPORT IN AN MBMS NETWORK

(71) Applicant: Telefonaktiebolaget L M Ericsson (Publ), Stockholm (SE)

(72) Inventors: Zongshuai Zhang, Shanghai (CN); Qi Xia, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 108 days.

(21) Appl. No.: 14/907,697

(22) PCT Filed: Aug. 30, 2013

(86) PCT No.: PCT/CN2013/001025
§ 371 (c)(1),
(2) Date: Jan. 26, 2016

(87) PCT Pub. No.: WO2015/027357
PCT Pub. Date: Mar. 5, 2015

(65) Prior Publication Data
US 2016/0174193 A1 Jun. 16, 2016

(51) Int. Cl.
*H04W 72/00* (2009.01)
*H04W 4/06* (2009.01)
(Continued)

(52) U.S. Cl.
CPC ....... *H04W 72/005* (2013.01); *H04L 61/2007* (2013.01); *H04L 61/2069* (2013.01);
(Continued)

(58) Field of Classification Search
None
See application file for complete search history.

(56) References Cited

U.S. PATENT DOCUMENTS

2010/0067405 A1* 3/2010 Kanazawa ............. H04W 4/06 370/254
2011/0141963 A1* 6/2011 Lim ...................... H04H 20/67 370/312

FOREIGN PATENT DOCUMENTS

CN 101047716 B 5/2011
CN 102325145 A 1/2012
(Continued)

OTHER PUBLICATIONS

International Search Report (and Written Opinion) dated Jul. 24, 2014 for International Application No. PCT/CN2013/001025, International Filing Date Aug. 30, 2013, consisting of 11 pages.
(Continued)

*Primary Examiner* — Diane Lo
(74) *Attorney, Agent, or Firm* — Christopher & Weisberg, P.A.

(57) ABSTRACT

Multicasting in Multimedia Broadcast Multicast Service (MBMS) nodes and the respective nodes. The method in a node configured as an MBMS gateway includes, in response to receipt of a session start request message for a multicast session, allocating a transport network IPv4 multicast address and a transport network IPv6 multicast address for the session, and generating another session start request message and transmitting it to a node configured as a Mobility Management Element (MME). The session start request message includes a first pair of the allocated transport network IPv4 multicast address and an IPv4 multicast source address, and a second pair of the allocated transport network IPv6 multicast address and an IPv6 multicast source address. In response to receipt of MBMS data from a node configured as a Broadcast-Multicast Service Center (BM-SC), the MBMS data is sent using at least one of the first and second pair of addresses.

40 Claims, 6 Drawing Sheets

(51) Int. Cl.
H04W 76/00 (2009.01)
H04L 29/12 (2006.01)
H04W 88/16 (2009.01)

(52) U.S. Cl.
CPC ........ *H04L 61/251* (2013.01); *H04L 61/6059* (2013.01); *H04W 4/06* (2013.01); *H04W 76/002* (2013.01); *H04W 88/16* (2013.01)

(56) References Cited

FOREIGN PATENT DOCUMENTS

CN 102404200 A 4/2012
CN 102984300 A 3/2013

OTHER PUBLICATIONS

European Supplementary Search Report and Written Opinion dated Mar. 8, 2017 for European Application Serial No. 13 892 123.4-1505, European Regional Phase Entry Date: Feb. 15, 2016 consisting of 9 pages.
M. Boucadair et al.—Network Working Group, Internet-Draft, Intended Status: Standards Track, Expires: Sep. 8, 2011, Title: Session Description Protocol (SDP) Alternate Connectivity (ALTC) Attribute draft-boucadair-mmusic-altc-02.txt, Mar. 7, 2011 consisting of 14-pages.
Behave Working Group, Internet-Draft, Intended Status: Informational, Expires: Sep. 15, 2011 C. Jacquenet, M. Boucadair, France Telecom, Y. Lee, Comcast, J. Qin, ZTE, T. Tsou, Huawei Technologies (USA), Title: IPv4-IPv6 Multicast: Problem Statement and Use Cases, draft-jaclee-behave-v4v6-mcast-ps-02, Mar. 14, 2011 consisting of 21-pages.
3GPP TS 23.246 V11.1.0 (Mar. 2012) 3rd Generation Partnership Project; Technical Specification Group Services and System Aspects; Multimedia Broadcast/Multicast Service (MBMS); Architecture and Functional Description (Release 11) Mar. 9, 2012 consisting of 66-pages.
3GPP TSG-CT WG3 Meeting #68-BIS, C3-120765, Change Request, 29.061 CR 0373, Version 11.0.0, Title: "Time to MBMS Data Transfer," Source to WG: Ericsson, Source to TSG: C3, Work Item Code: MBMS_EPS, Conference Location and Date: Taipei, Taiwan, Apr. 16-20, 2012 consisting of 5-pages.
3GPP TS 29.061 V12.2.0 (Jun. 2013) 3rd Generation Partnership Project; Technical Specification Group Core Network and Terminals; Interworking between the Public Land Mobile Network (PLMN) Supporting Packet Based Services and Packet Data Networks (PDN) (Release 12) Jun. 27, 2013 consisting of 163-pages.
3GPP TS 36.300 V11.6.0 (Jun. 2013) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11) Jul. 8, 2013 consisting of 209-pages.
3GPP TS 29.274 V13.4.0 (Dec. 2015) 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13) Dec. 17, 2015 consisting of 341-pages.
3GPP TS 36.443 V13.2.0 (Dec. 2015)_3rd Generation Partnership Project; Technical Specification Group Radio Access Network; Evolved Universal Terrestrial Radio Access Network (E-UTRAN); M2 Application Protocol (M2AP) (Release 13) Dec. 21, 2015 consisting of 93-pages.
3GPP TS 36.444 V13.1.0 (Dec. 2015) 3rd Generation Partnership Project; Technical Specification Group Radio Access Network; Evolved Universal Terrestrial Radio Access Network (E-UTRAN); M3 Application Protocol (M3AP) (Release 13) Dec. 21, 2015 consisting of 66-pages.
Communication from European Patent Office in corresponding European Application, Application No. 13892123.4 dated Oct. 9, 2017, consisting of 5-pages.

* cited by examiner

IPV4 AND IPV6 SUPPORT IN AN MBMS NETWORK

TECHNICAL FIELD

The present disclosure generally relates to multicast/broadcast service, and more particularly relates to supporting both IPv4 and IPv6 Multimedia Broadcast Multicast Service (MBMS).

BACKGROUND

The 3rd Generation Partnership Project (3GPP) has developed specifications for MBMS, which provides broadcast and multicast services over radio networks. With the development of the mobile devices' capability of consuming multimedia content and the deployment of wideband radio networks, MBMS are becoming widely spread. The Long Term Evolution (LTE) has introduced evolved MBMS (eM-BMS) to deliver multimedia data from a single source entity to multiple destinations in LTE. A description of the MBMS system architecture and functionality is given in 3GPP TS 23.246, v11.1.0, March 2012.

FIG. 1 illustrates the logical architecture of eMBMS, which is described in further detail in 3GPP TS 36.300, v11.6.0, July 2013.

The MBMS-specific components in FIG. 1 include an MBMS Gateway (MBMS GW) 110 and a Multicast Coordination Entity (MCE) 130. The MSMS GW 110 is connected to eNodeB(s) 140 via an M1 interface and connected to a Broadcast Multicast-Service Center (BM-SC) 150 via SGmb and SGi-mb interfaces. The MCE 130 is connected to eNodeB(s) 140 via an M2 interface. The MCE 130 is connected to an MME 120 via an M3 interface. The MCE 130 is a logical entity that may be standalone network node or may be part of another network node (e.g., an eNodeB 140 or MME 120). The MCE 130 handles admission control and the allocation of the radio resources used by all eNodeBs 140 in the Multicast-Broadcast Single Frequency Network (MBSFN) area for multi-cell MBMS transmission using MBSFN operation. The MCE 130 decides not to establish the radio bearer(s) of the new MBMS service(s) if the radio resources are not sufficient for the corresponding MBMS service(s) or may pre-empt radio resources from other radio bearer(s) of ongoing MBMS service(s) based on Allocation/Retention Priority (ARP). Besides allocation of the time/frequency radio resources, this also includes deciding the further details of the radio configuration, e.g., the modulation and coding scheme. The MCE 130 also performs the following functions:

Counting and acquisition of counting results for MBMS service(s);

Resumption of MBMS session(s) within MBSFN area(s) based on e.g. the ARP and/or the counting results for the corresponding MBMS service(s); and Suspension of MBMS session(s) within MBSFN area(s) based e.g. the ARP and/or on the counting results for the corresponding MBMS service(s).

The MCE 130 is involved in MBMS Session Control Signalling, but does not perform UE-MCE signalling. When the MCE 130 is part of another network element, an eNodeB 140 is served by a single MCE 130.

The MBMS GW 110 is also a logical entity. The MBMS GW 110 may be a standalone network node, or may be part of another network node. The MBMS GW 110 is present between the BM-SC 150 and eNodeB(s) 140, and its principal functions is the sending/broadcasting of MBMS packets to each eNodeB transmitting the service. The MBMS GW 110 uses IP Multicast as the means of forwarding MBMS user data to the eNodeB(s). The MBMS GW 110 performs MBMS Session Control Signalling (e.g., session start/stop) towards the Evolved Universal Terrestrial Radio Access Network (E-UTRAN) via the MME 120.

Protocol Independent Multicast (PIM)-Source Specific Multicast (SSM) is the chosen multicast method in 3GPP. During establishment of an MBMS session, the MBMS GW will set a multicast source IP address (S), allocate a transport network multicast IP address (G), and send the multicast address distribution including S and G to the MCE and then to the eNodeB so that the eNodeB may join the addresses to enable reception of MBMS data.

Now the 3GPP signaling protocols for the interfaces including M1, M2 and M3 support only one type of IP multicast distribution address, either in IPv4 or IPv6. Therefore the broadcast/multicast can be done either through IPv4 or IPv6, in other words, the multicast distribution of eMBMS is applicable to only one type of network. However, some operators have not deployed pure IPv6 radio access networks or backhaul networks yet, e.g. they are still operating pure IPv4 networks, or hybrid networks of IPv4 and IPv6. This may cause some problems in applying the eMBMS. For instance, if some eNodeBs only support IPv4 while others support IPv6, then only part of the eNodeBs may join a multicast group since the multicast is done either through IPv4 or IPv6. Even if the eNodeBs support both IPv4 and IPv6, it is possible that the backhauls only support one type of IP addresses. In this case still only part of the eNodeBs may join the multicast group, unless additional routers are added and tunnels are setup for the multicast, which will complicate the backhaul network.

SUMMARY

Therefore, it is an object of the present disclosure to solve one of the above-mentioned problems.

According to an aspect of the disclosure, a method of multicasting in a node configured as an MBMS GW is disclosed. The method comprises in response to receipt of a session start request message for a multicast session, allocating a transport network IPv4 multicast address and a transport network IPv6 multicast address for the session, and generating another session start request message and transmitting it to a node configured as an MME. The other session start request message may include a first pair of the allocated transport network IPv4 multicast address and an IPv4 multicast source address, and a second pair of the allocated transport network IPv6 multicast address and an IPv6 multicast source address. The method further comprises in response to receipt of MBMS data from a node configured as a BM-SC, sending the MBMS data using at least one of the first and second pair of addresses.

According to another aspect of the disclosure, a method of multicasting in a node configured as an MME is disclosed. The method comprises receiving a session start request message from a node configured as an MBMS GW. The session start request message includes a first pair of a transport network IPv4 multicast address and an IPv4 multicast source address, and a second pair of a transport network IPv6 multicast address and an IPv6 multicast source address. The method further comprises generating another session start request message which includes at least one of the first and second pair of addresses, and transmitting the other session start request message to a node configured as an MCE.

According to still another aspect of the disclosure, a method of multicasting in a node configured as an MCE is disclosed. The method comprises receiving a session start request message from a node configured as an MME. The session start request message includes at least one pair of a first pair of a transport network IPv4 multicast address and an IPv4 multicast source address and a second pair of a transport network IPv6 multicast address and an IPv6 multicast source address. The method further comprises generating another session start request message including the at least one of the first and second pair of addresses, and transmitting the other session start request message to a node configured as an eNodeB.

According to still another aspect of the disclosure, a method of multicasting in a node configured as an eNodeB is disclosed. The method comprises receiving a session start request message from a node configured as an MCE. The session start request message includes at least one pair of a first pair of a transport network IPv4 multicast address and an IPv4 multicast source address and a second pair of a transport network IPv6 multicast address and an IPv6 multicast source address. The method further comprises joining one of the at least one pair of addresses to enable reception of the MBMS data.

According to still another aspect of the disclosure, a node configured as an MBMS GW is disclosed. The MBMS GW node comprises a transceiver adapted to receive a session start request message for a multicast session and a multicast controlling unit adapted to in response to receipt of the session start request message, allocate a transport network IPv4 multicast address and a transport network IPv6 multicast address for the session. The multicast controlling unit is further adapted to generate another session start request message. The other session start request message includes a first pair of the allocated transport network IPv4 multicast address and an IPv4 multicast source address, and a second pair of the allocated transport network IPv6 multicast address and an IPv6 multicast source address. The transceiver is further adapted to transmit the other session start request message to a node configured as an MME, and in response to receipt of MBMS data from a node configured as a BM-SC, send the MBMS data using at least one of the first and second pair of addresses.

According to still another aspect of the disclosure, a node configured as an MME is disclosed. The MME node comprises a transceiver adapted to receive a session start request message from an MBMS GW node. The session start message includes a first pair of a transport network IPv4 multicast address and an IPv4 multicast source address, and a second pair of a transport network IPv6 multicast address and an IPv6 multicast source address. The MME node further comprises a multicast controlling unit adapted to generate another session start request message which includes at least one of the first and second pair of addresses. The transceiver is further adapted to transmit the other session start request message to an MCE node.

According to still another aspect of the disclosure, a node configured as an MCE is disclosed. The MCE node comprises a transceiver adapted to receive a session start request message from an MME node. The session start request message includes at least one pair of a first pair of a transport network IPv4 multicast address and an IPv4 multicast source address and a second pair of a transport network IPv6 multicast address and an IPv6 multicast source address. The MCE node further comprises a multicast controlling unit adapted to generate another session start request message including the at least one of the first and second pair of addresses. The transceiver is further adapted to transmit the other session start request message to an eNodeB node.

According to still another aspect of the disclosure, a node configured as an eNodeB is disclosed. The eNodeB node comprises a transceiver adapted to receive a session start request message from the MCE node. The session start request message includes at least one pair of a first pair of a transport network IPv4 multicast address and an IPv4 multicast source address and a second pair of a transport network IPv6 multicast address and an IPv6 multicast source address. The eNodeB node further includes a multicast controlling unit adapted to join one of the at least one pair of addresses to enable reception of the MBMS data.

Since the MBMS GW allocates both the transport network IPv4 multicast address and the transport network IPv6 multicast address and multicasts the MBMS data using both IPv4 and IPv6 addresses, the eNodeB will be able to selectively join either a IPv4 or IPv6 multicast group according to its capability. Hence the multicast/broadcast may be applied to the Radio Access Network (RAN) regardless of its capability to support IPv4 or IPv6.

BRIEF DESCRIPTION OF THE DRAWINGS

The invention will be described in detail by reference to the following drawings, in which.

DETAILED DESCRIPTION

Figure 1:
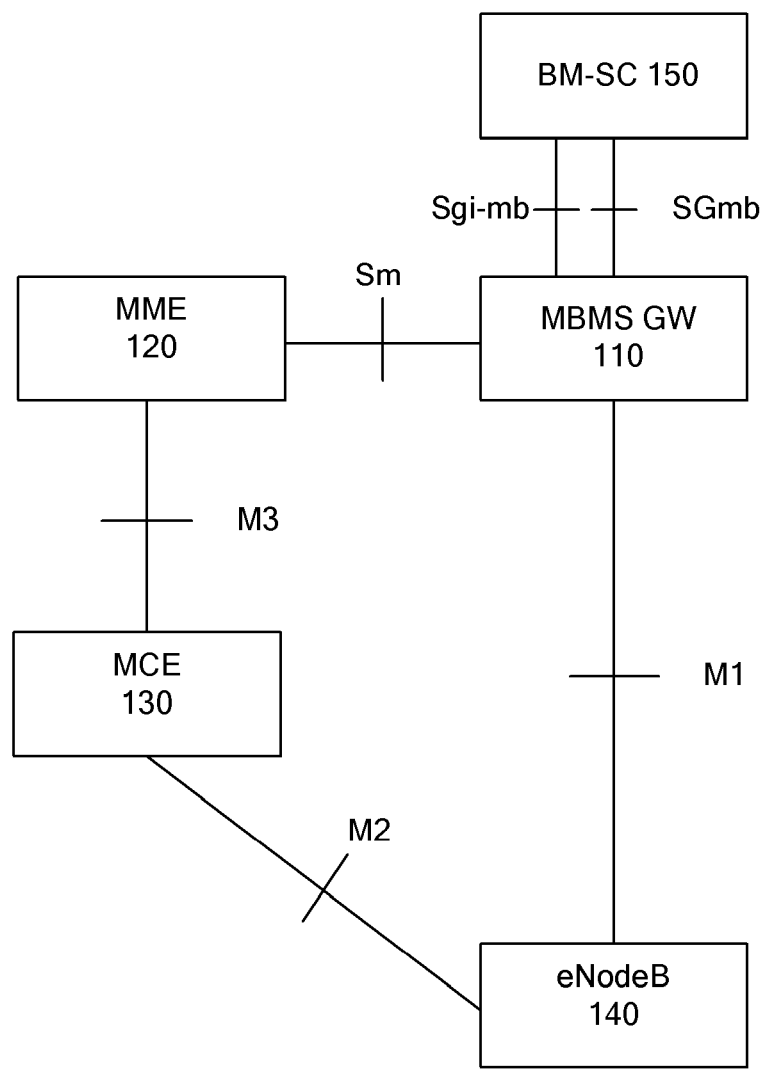
FIG. 1 illustrates the logical architecture of eMBMS.

Embodiments of the present disclosure will be described more fully hereinafter with reference to the accompanying drawings, in which embodiments of the disclosure are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the disclosure is described with reference to the LTE and eMBMS in the context, the skilled in the art should understand that the invention is not limited to this, but can indeed be applied to all existing and future wireless communication networks that support MBMS. In the disclosure the terms "broadcast" and "multicast" are used in an exchangeable manner since the difference between broadcast and multicast are only at radio side and does not have impact on MBMS session handling. Although specific terms are used here, such as eNodeB, it should be understood that the invention is not limited to those specific terms but can be applied to all similar entities.

Embodiments of the disclosure will be described below with reference to the drawings.

One approach to solve the problem is to establish two separate MBMS sessions for IPv4 and IPv6 respectively. That is, during establishment of one multicast session, the MBMS GW allocates a transport network IPv4 multicast address and sends the allocated transport network IPv4 multicast address as well as the IPv4 multicast source address to the MME, MCE and eNodeB, so that eNodeBs that supports IPv4 may join the IPv4 addresses to enable reception of MBMS data. During establishment of another multicast session, the MBMS GW allocates a transport network IPv6 multicast address and sends the allocated transport network IPv4 multicast address as well as the IPv6 multicast source address to the MME, MCE and eNodeB, so that eNodeBs that supports IPv6 may join the IPv6 addresses to enable reception of the MBMS data. Therefore the multicast/broadcast may be applied to the whole network regardless of the capability of the eNodeBs and backhauls to support IPv4 or IPv6. However, such an approach may consume a large amount of resources since the number of MBMS sessions and the payload over the Sgi-mb interface will be doubled.

Therefore it is proposed to solve the problem by introducing both IPv4 and IPv6 multicast distribution addresses during the establishment of multicast session, so that the eNodeB may join the multicast group selectively according to its capability.

Figure 2:
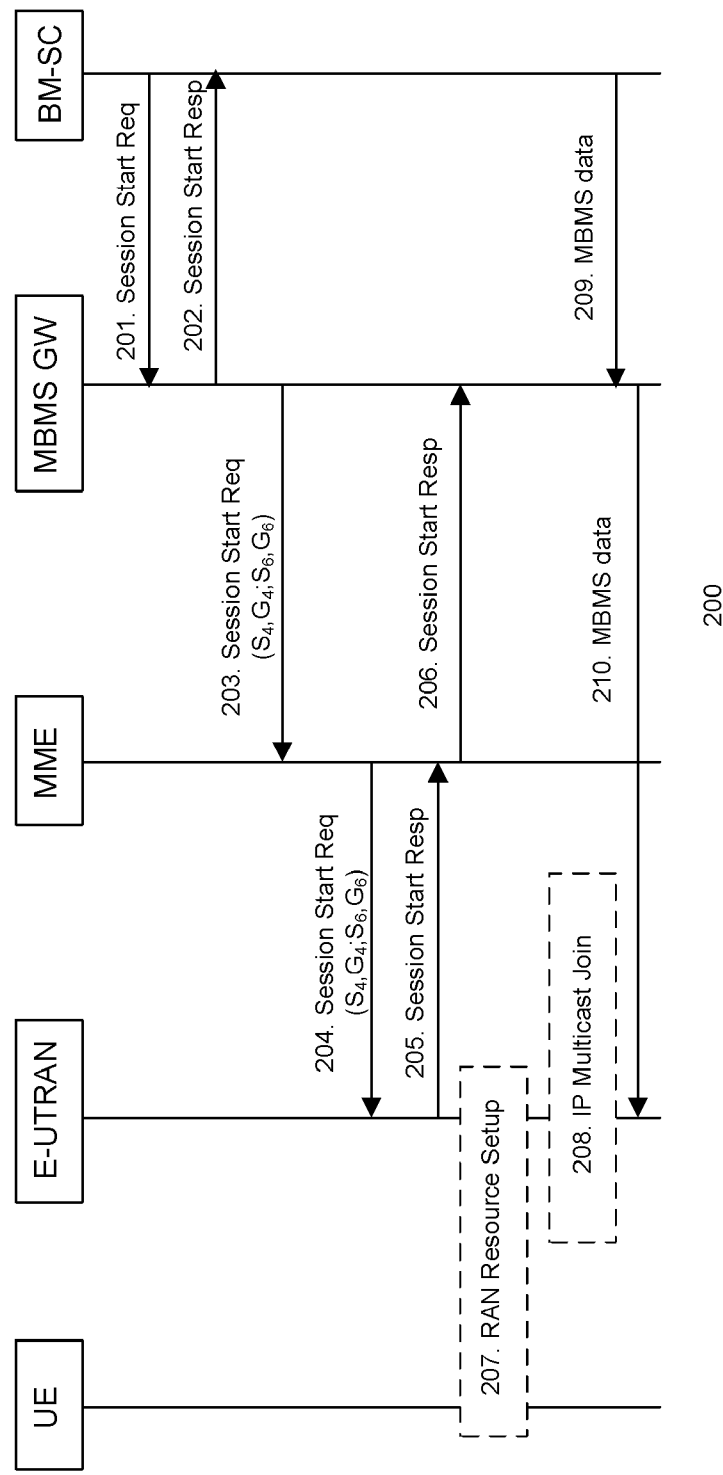
FIG. 2 illustratively shows a signaling flow of multicasting establishment in accordance to an embodiment of the disclosure.

FIG. 2 illustratively shows a signaling flow of multicasting establishment in accordance to an embodiment of the disclosure.

The signaling flow is modified based on that described in the 3GPP TS 23.246, v11.1.0, March 2012, hence those known steps or elements are not described in detail since they would obscure the invention in unnecessary detail.

At step 201, the BM-SC transmits a session start request message to MBMS GW to indicate the impending start of the transmission and to provide the session attributes, including Temporary Mobile Group Identity (TMGI), Flower Identifier, QoS, MBMS service Area, Session identifier, etc.

At step 202, the MBMS GW responds with a session start response message with information for BM-SC to send MBMS data to the MBMS GW.

Unlike the conventional procedure as defined in 3GPP TS 23.246, v11.1.0, March 2012 which allocates a common tunnel endpoint (C-TEID) and only one transport network multicast address either in IPv4 or IPv6, the MBMS GW allocates at step 203 both a transport network IPv4 multicast address (G4) and a transport network IPv6 multicast address (G6) for the session in addition to the C-TEID. The MBMS GW generates a session start request message including a first pair of the allocated transport network IPv4 multicast address and an IPv4 multicast source address (S4, G4), and a second pair of the allocated transport network IPv6 multicast address and an IPv6 multicast source address (S6, G6), and transmits the message to the MME.

At step 204, after receiving the session start request from the MBMS GW, the MME generates another session start request message which includes both the first (S4, G4) and second pair of addresses (S6, G6) and transmits it to the E-UTRAN, including the MCE and eNodeB(s).

At step 205, after receiving the session start request, the E-UTRAN responds to the MME to confirm the reception of the session start request message.

At step 206, after receiving the session start response from the E-UTRAN, the MME responds to the MBMS GW.

At step 207, the E-UTRAN set up the necessary radio resources for the transfer of MBMS data to the interested UEs.

At step 208, if an eNodeB in the E-UTRAN accepts IP multicast distribution, it joins one pair of transport network IP multicast and the multicast source address based on its capability to enable reception of MBMS data. For example, an IPv4 eNodeB joins the first pair of addresses (S4, G4) while an IPv6 eNode joins the second pair of addresses (S6, G6).

At step 209, the BM-SC starts sending the MBMS data.

At step 210, upon receipt of the MBMS data, the MBMS GW sends the MBMS data using both the first and second pair of addresses towards all joined eNodeBs. In other words, the MBMS GW encapsulates the payload of the MBMS data to both IPv4 packets and IPv6 packets and send the packets using both pairs of addresses respectively.

Since the MBMS GW allocates both the transport network IPv4 multicast address (G4) and the transport network IPv6 multicast address (G6) and broadcasts/multicasts the MBMS data using both IPv4 and IPv6 addresses, the eNodeB will be able to selectively join either a IPv4 or IPv6 multicast group according to its capability. Hence the multicast/broadcast may be applied to the RAN regardless of its capability to support IPv4 or IPv6. The operators may use the eMBMS solution even if their eNodeBs or backhauls are not pure IPv4 or IPv6. The operators with pure IPv4 eNodeBs and backhauls may also upgrade their equipment to IPv6 step by step without impact on eMBMS.

It should be noted that although the messages as generated by the nodes are indicated as "session start request" messages or "session start response" messages and may include the same information such as session attributes, these messages do not have to be in the same message format.

In an alternative embodiment, the MME may include in the session start request message only one of the first and second pairs of addresses if the MME knows the capability of the E-UTRAN. For instance, if the MME knows that the eNodeBs or backhauls support only IPv4, then it may include only the first pair of addresses (S4, G4) in the session start request message. The nodes in the E-UTRAN, including the MCE and eNodeBs, are informed of only the first pair of addresses as the conventional procedure did. Therefore the MCE and eNodeBs do not need to be modified.

In another alternative embodiment, the MCE may include in the session start request message only one of the first and second pairs of addresses if the MCE knows the capability of the eNodeB(s). For instance, the MCE may transmit a session start request message including only the first pair of addresses (S4, G4) to an eNodeB which supports IPv4 only, and transmit another session start request message including only the second pair of addresses (S6, G6) to another eNodeB which supports IPv6. In case that the MCE does not know the capability of the eNodeB(s), it may try a heuristic solution. For instance, the MCE may first generate and transmit a session start request message including only the second pair of addresses (S6, G6) to the eNodeB. If the eNodeB supports IPv6, it may join the second pair of addresses. Otherwise, the eNodeB may transmit to the MCE a response indicating a failure to start the session. Upon receipt of the response, the MCE may generate and transmit another session start request message including only the first pair of addresses (S4, G4) to the eNodeB, and the eNodeB may join the first pair of addresses which fit for its capability. Therefore the eNodeBs do not need to be modified.

In a further alternative embodiment, instead of transferring the MBMS data using both the first and second pair of addresses respectively, the MBMS GW may send the MBMS data using only one pair of addresses if the joined eNodeBs support only that pair of addresses. For instance, all the joined eNodeBs support only the first pair of addresses (S4, G4), and the MBMS GW may send the MBMS data using only the first pair of addresses (S4, G4). The payload of the MBMS data will be encapsulated to only IPv4 packets. In case that all the eNodeB(s) joining the multicast support the same type of IP address (either IPv4 or IPv6), the MBMS GW only needs to encapsulate the MBMS data to one type of IP packets and send the packets using the corresponding pair of addresses, thus the resources may be saved.

Figure 3:
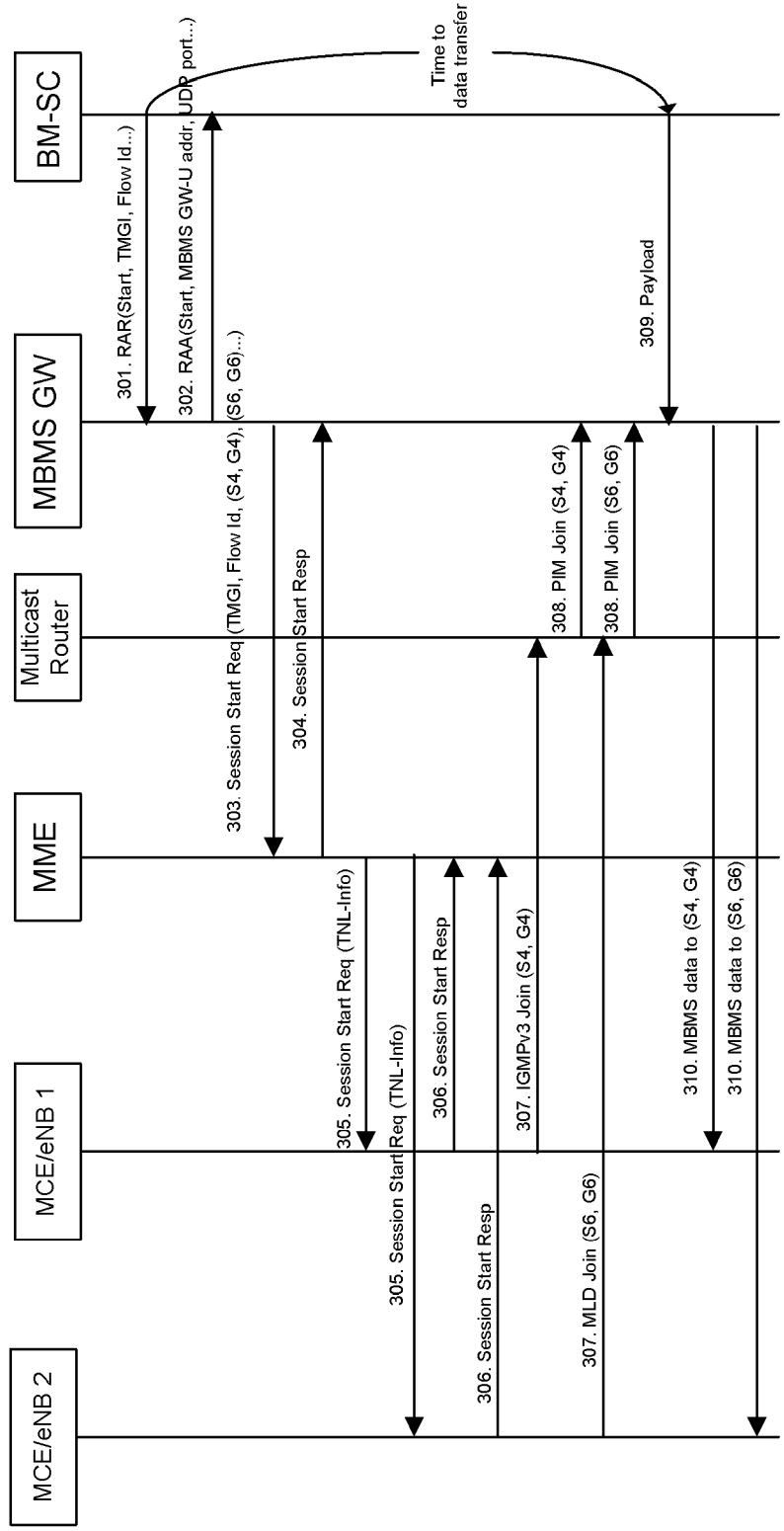
FIG. 3 illustratively shows a signaling flow of multicast establishment in accordance to another embodiment of the disclosure.

FIG. 3 illustratively shows a signaling flow of multicast establishment in accordance to another embodiment of the disclosure, in which the messages are mapped to more specific messages according to the 3GPP TS 29.061, TS 29.274, TS 36.443 and TS 36.444 specifications. However, it should be noted that the specific signaling flow is for illustrative purpose only and the skilled in the art may conceive various approaches to implement the inventive concept of the disclosure.

At step 301, the BM-SC transmits a Re-Auth-Request (RAR) (Start) message to MBMS GW over SGmb interface. Among the session attributes included in the RAR message, a "time to data transfer" is a timer started by the BM-SC and indicates time to transfer MBMS data. It may be set to enable both IPv4 multicast and IPv6 multicast to be established within the time.

At step 302, the MBMS GW allocates two pairs of multicast distribution addresses (S4, G4) and (S6, G6) for outgoing traffic and a User Datagram Protocol (UDP) port for incoming traffic in the session. The MBMS GW creates a bearer context and responds with a Re-Auth-Answer (RAA) (Start) message including the allocated UDP port to the BM-SC.

At step 303, the MBMS GW transmits an MBMS session start request message to the MME to establish GPRS Tunnelling Protocol User Plane (GTPv1-U) tunnels for payload transfer over the M1 interface. The message may include a "MBMS IP Multicast Distribution" Information Element (IE) to carry (S4, G4) and (S6, G6). The below Table 1 shows an example of expanding the "MBMS IP Multicast Distribution" as defined in 3GPP TS 29.272, section 8.73, in which an additional pair of transport network multicast address and multicast source address is added.

TABLE 1

| MBMS IP Multicast Distribution IE | |
|---|---|
| | Bits |
| Octets | 8  7  6  5  4  3  2  1 |
| 1 | Type = 142 (decimal) |
| 2 to 3 | Length = x |
| 4 | Spare                              Instance |
| 5 to 8 | Common Tunnel Endpoint Identifier |
| 9 | Address Type            Address Length |
| 10 to k | IP Transport Network Multicast Address (IPv4 IPv6) |
| K + 1 | Address Type            Address Length |
| (k + 2) to m | IP Multicast Source Address (IPv4 IPv6) |
| m + 1 | Address Type            Address Length |
| (m + 2) to n | IP Transport Network Multicast Address (IPv4 IPv6) |
| n + 1 | Address Type            Address Length |
| (n + 2) to s | IP Multicast Source Address (IPv4 IPv6) |
| s + 1 | MBMS HC Indicator |
| s + 2 to x | These octet(s) is/are present only if explicitly specified |

At step 304, the MME responds with an MBMS session start response.

At step 305, the MME creates an MBMS bearer context, stores the session attributes and transmits a session start request to all relevant eNodeBs/MCEs (indicated as MCE/eNB1 and MCE/eNB2) listed in the service area identity, to indicate the impending start of the transmission. The message may include one expanded Transport Network Layer (TNL) Information to carry both (S4, G4) and (S6, G6), or two TNL Information to carry (S4, G4) and (S6, G6) respectively. In the alternative embodiment as discussed above, the message may also include only one pair of the addresses if the capability of the E-UTRAN is known to the MME.

At step 306, the MCE/eNBs (MCE/eNB1, MCE/eNB2) create an MBMS bearer context, stores the session attributes and responds the MME with a session start response message. The MCE1 or MCE2 may transmit to the corresponding eNodeB a session start request message including both pairs of addresses, or including only one pair of addresses that is supported by the corresponding eNodeB. The addresses may be carried by one or two TNL information. If the MCE and eNode B are co-located, the message may be an internal message.

At step 307, each eNodeB (eNB1, eNB2) joins (S4) through Internet Group Management Protocol version 3 (IGMPv3) or (S6, G6) through Multicast Listener Discovery Protocol (MLD) according to its capability or its network capability. Suppose eNB1 transmits an MLD join message to (S4, G4) and eNB2 transmits an MLD join message to (S6, G6).

The multicast tree within backhaul is managed using (Protocol-Independent Multicast) PIM. At step 308, the next hop multicast router will send a PIM join message to the MBMS GW when the multicast tree is established. As shown, two multicast trees corresponding to (S4, G4) and (S6, G6) are established respectively.

At step 309, after the timer of "time to data transfer" expires, the BM-SC sends MBMS data towards the MBMS GW over the Sgi-mb interface.

At step 310, the MBMS GW transfers the MBMS data using both the first and second pair of addresses towards all joined eNodeBs. The payload of the MBMS data are encapsulated into a GTPv1-U Protocol Data Unit (PDU) with (S4, G4) and (S6, G6) respectively, which means there will be two GTPv1-U packets corresponding to one payload packet. The encapsulated multicast packets are sent within two PIM trees. In the alternative embodiment as discussed above, the MBMS GW may send the MBMS data using only one pair of addresses joined by the eNodeBs.

Figure 4:
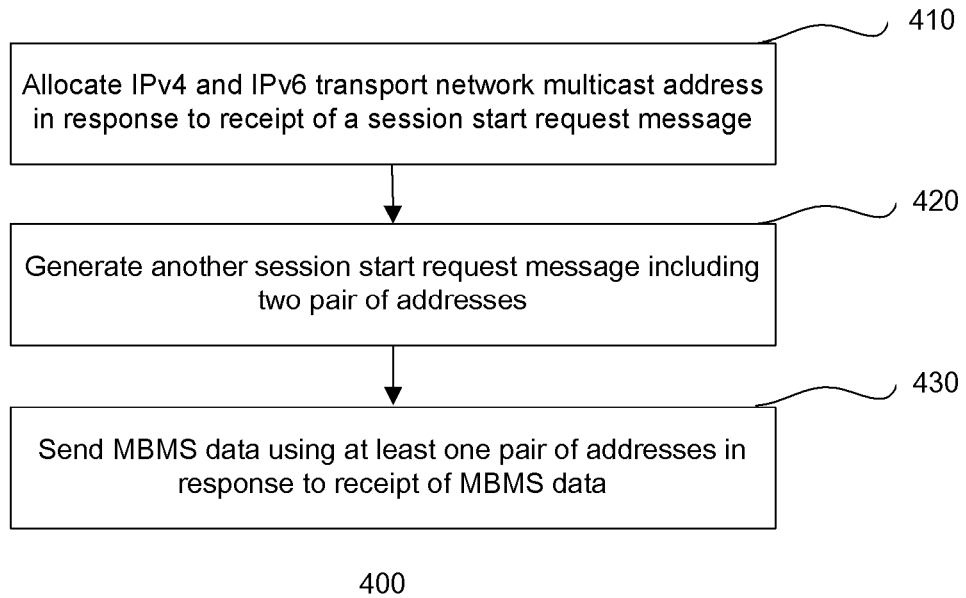
FIG. 4 illustratively shows a method 400 of multicasting in a node configured as an MBMS GW.

FIG. 4 illustratively shows a method 400 of multicasting in a node configured as an MBMS GW.

At step 410, in response to receipt of a session start request message for a multicast session, the MBMS GW node allocates a transport network IPv4 multicast address and a transport network IPv6 multicast address for the session. At step 420, the MBMS GW node generates another session start request message and transmitting it to a node configured as an MME. The other session start request message may include a first pair of the allocated transport network IPv4 multicast address and an IPv4 multicast source address, and a second pair of the allocated transport network IPv6 multicast address and an IPv6 multicast source address. At step 430, in response to receipt of MBMS data from a node configured as a BM-SC, the MBMS GW node sends the MBMS data using at least one of the first and second pair of addresses. The MBMS GW node may send the MBMS data using the first pair of addresses and send the MBMS data using the second pair of addresses respectively. Alternatively, the MBMS GW node may send the MBMS data using one pair of addresses joined by nodes configured as eNodeBs. The session start request message may include a RAR message received from the BM-SC node. The RAR message may include information indicating time to MBMS data transfer, wherein the information is set to enable both IPv4 multicast and IPv6 multicast to be established within the time. The MBMS GW node may further allocate a User Datagram Protocol (UDP) port for incoming traffic in the session, and transmit a RAA message including the allocated UDP port to the BM-SC node. The other session start request message may include an MBMS IP Multicast Distribution IE which carries the first and second pair of addresses.

Figure 5:
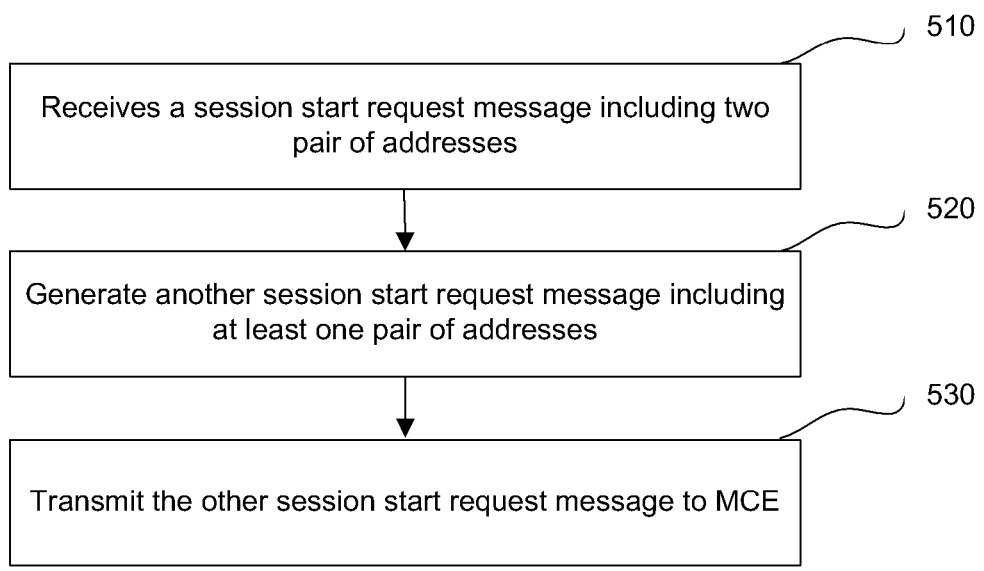
FIG. 5 illustratively shows a method 500 of multicasting in a node configured as an MME.

FIG. 5 illustratively shows a method 500 of multicasting in a node configured as an MME.

At step 510, the MME receives a session start request message from a node configured as an MBMS GW. The session start request message includes a first pair of a transport network IPv4 multicast address and an IPv4 multicast source address, and a second pair of a transport network IPv6 multicast address and an IPv6 multicast source address. At step 520, the MME node generates another session start request message which includes at least one of the first and second pair of addresses. At step 530, the MME node transmits the other session start request message to a node configured as an MCE. The other session start request message may include both the first and second pair of addresses. Alternatively, the other session start request message may include one pair of addresses that is supported by a radio access network of the MCE node. The at least one of the first and second pair of addresses may be carried by at least one TNL information.

Figure 6:
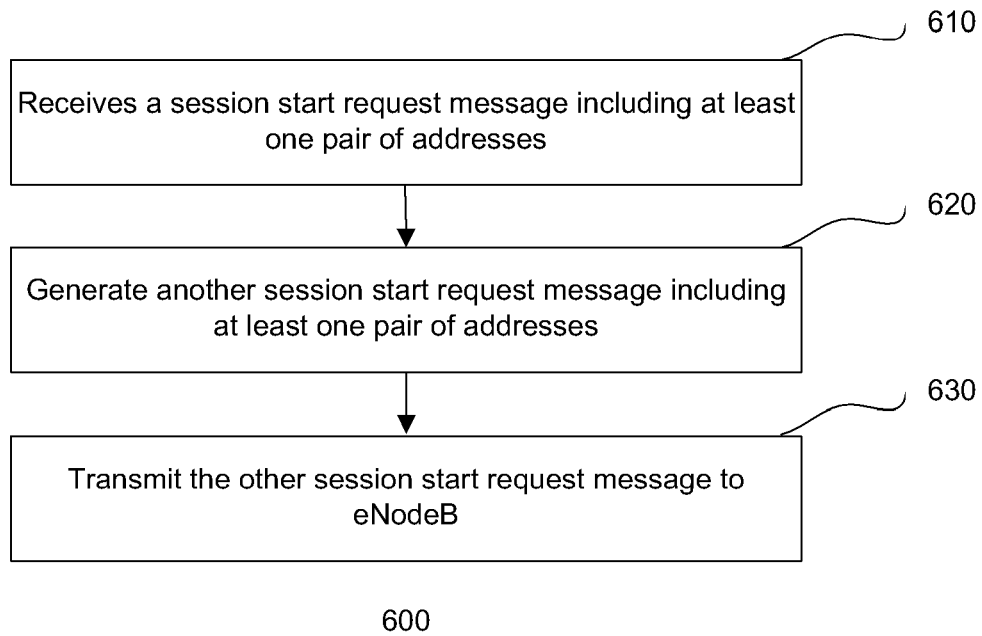
FIG. 6 illustratively shows a method 600 of multicasting in a node configured as an MCE.

FIG. 6 illustratively shows a method 600 of multicasting in a node configured as an MCE.

At step 610, the MCE node receives a session start request message from a node configured as an MME. The session start request message includes at least one pair of a first pair of a transport network IPv4 multicast address and an IPv4 multicast source address and a second pair of a transport network IPv6 multicast address and an IPv6 multicast source address. The MCE node generates at step 620 another session start request message including the at least one of the first and second pair of addresses, and transmits at step 630 the other session start request message to a node configured as an eNodeB. The other session start request message may include both the first and second pair of addresses. Alternatively, the other session start request message may include one pair of addresses that is supported by the eNodeB node. Alternatively, the other session start request message may include one pair of addresses to the eNodeB node, and the MCE node may generate a further session start request message including the other pair of addresses in response to receipt of a response indicating a failure to start the session, and transmit the further session start request message to the eNodeB node. The at least one of the first and second pair of addresses may be carried by at least one TNL information.

Figure 7:
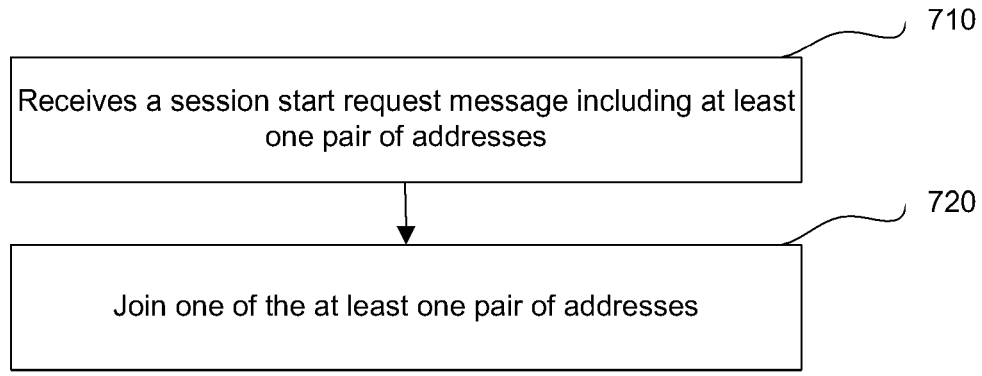
FIG. 7 illustratively shows a method 700 of multicasting in a node configured as an eNode B.

FIG. 7 illustratively shows a method 700 of multicasting in a node configured as an eNode B.

At step 710, the eNodeB node receives a session start request message from a node configured as an MCE. The session start request message includes at least one pair of a first pair of a transport network IPv4 multicast address and an IPv4 multicast source address and a second pair of a transport network IPv6 multicast address and an IPv6 multicast source address. At step 720, the eNodeB node joins one of the at least one pair of addresses to enable reception of the MBMS data. If only one pair of addresses is included in the session start request message, the eNodeB node may join the one pair of addresses. If the one pair of addresses is not supported by the eNodeB node, the eNodeB node may transmit to the MCE node a response indicating a failure to start the session, and join the other pair of addresses in response to receipt of another session start request message including the other pair of addresses from the MCE node. If both the first and second pairs of addresses are included in the session start request message, the eNodeB node may join one pair of addresses that is supported by the eNodeB node.

Figure 8:
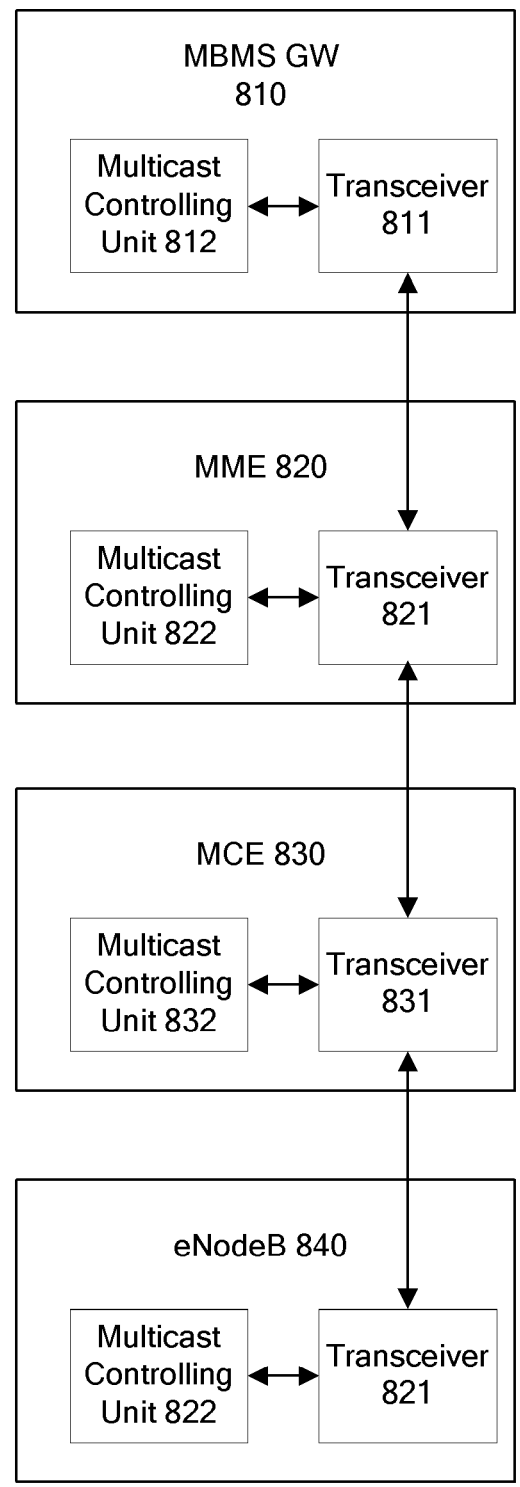
FIG. 8 illustratively shows a block diagram of nodes involved in multicasting in accordance with an embodiment of the disclosure.

FIG. 8 illustratively shows a block diagram of nodes involved in multicasting in accordance with an embodiment of the disclosure. The involved nodes as shown includes 4 nodes, i.e. an MBMS GW node 810, an MME node 820, an MCE node 830 and an eNodeB node 840.

The MBMS GW node 810 comprises a transceiver 811 adapted to receive a session start request message for a multicast session and a multicast controlling unit 812 adapted to in response to receipt of the session start request message, allocate a transport network IPv4 multicast address and a transport network IPv6 multicast address for the session. The multicast controlling unit 812 is further adapted to generate another session start request message. The other session start request message includes a first pair of the allocated transport network IPv4 multicast address and an IPv4 multicast source address, and a second pair of the allocated transport network IPv6 multicast address and an IPv6 multicast source address. The transceiver 811 is further adapted to transmit the other session start request message to the MME node 820, and in response to receipt of MBMS data from a BM-SC node (not shown), send the MBMS data using at least one of the first and second pair of addresses. The transceiver 811 may be further adapted to send the MBMS data using the first pair of addresses and send the MBMS data using the second pair of addresses respectively. Alternatively, the transceiver 811 may be further adapted to send the MBMS data using one pair of addresses joined by eNodeB nodes. The multicast controlling unit 812 may be further adapted to allocate a UDP port for incoming traffic in the session, and the transceiver 811 may be further adapted to transmit a RAA message including the allocated UDP port to the BM-SC node.

The MME node 820 comprises a transceiver 821 adapted to receive a session start request message from the MBMS GW node 810. The session start message includes a first pair of a transport network IPv4 multicast address and an IPv4 multicast source address, and a second pair of a transport network IPv6 multicast address and an IPv6 multicast source address. The MME node 820 further comprises a multicast controlling unit 822 adapted to generate another session start request message which includes at least one of the first and second pair of addresses. The transceiver 821 is further adapted to transmit the other session start request message to an MCE node.

The MCE node 830 comprises a transceiver 831 adapted to receive a session start request message from the MME node 820. The session start request message includes at least one pair of a first pair of a transport network IPv4 multicast address and an IPv4 multicast source address and a second pair of a transport network IPv6 multicast address and an IPv6 multicast source address. The MCE node 830 further comprises a multicast controlling unit 832 adapted to generate another session start request message including the at least one of the first and second pair of addresses. The transceiver 831 is further adapted to transmit the other session start request message to the eNodeB node 840. The other session start request message may include one pair of addresses, and the multicast controlling unit 832 may be further adapted to in response to the transceiver receiving a response indicating a failure to start the session, generate a further session start request message including the other pair of addresses, and the transceiver 831 is further adapted to transmit the further session start request message to the eNodeB node 840.

The eNodeB node 840 comprises a transceiver 841 adapted to receive a session start request message from the MCE node 830. The session start request message includes at least one pair of a first pair of a transport network IPv4 multicast address and an IPv4 multicast source address and a second pair of a transport network IPv6 multicast address and an IPv6 multicast source address. The eNodeB node 840 further includes a multicast controlling unit 842 adapted to join one of the at least one pair of addresses to enable reception of the MBMS data. The multicast controlling unit 842 may be further adapted to, if only one pair of addresses is included in the session start request message, join the one pair of addresses. The transceiver 841 may be further adapted to, if the one pair of addresses is not supported by the eNodeB node 840, transmit to the MCE node 830 a response indicating a failure to start the session, and receive another session start request message including the other pair of addresses from the MCE node. The multicast controlling unit 842 may be further adapted to in response to receipt of the other session start request message, join the other pair of addresses. The multicast controlling unit 842 may be further adapted to if both the first and second pairs of addresses are included in the session start request message, join one pair of addresses that is supported by the eNodeB node 840.

It should be noted that components in the nodes may be implemented by software or hardware or the combination thereof. For example, the multicast controlling unit 812 may comprises a processing unit, which may be provided on a single chip or a chip module and which may be any processor or computer device that performs operations based on program codes or instructions stored in a memory. Program codes are fetched from the memory and loaded into the processing unit in order to perform the steps described in connection with FIG. 4. The multicast controlling unit 812 may share the same processing unit or memory with the node, or use separate hardware.

In the above description and figures, the MBMS session start procedure is illustrated. The MBMS session stop procedure and MBMS update procedure only need slightly modified to align with the introduction of two pair of addresses, which will not be further discussed.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention is not be limited to the particular embodiment disclosed as the best mode contemplated for carrying out the present invention, but that the present invention include all embodiments falling within the scope of the appended claims.

What is claimed is:

1. A method of multicasting in a node configured as a Multimedia Broadcast Multicast Service (MBMS) gateway, the method comprising:
  in response to receipt of a session start request message for a multicast session, allocating a transport network IPv4 multicast address and a transport network IPv6 multicast address for the session;
  generating another session start request message and transmitting the other session start request message to a node configured as a Mobility Management Element (MME), the other session start request message including a first pair of the allocated transport network IPv4 multicast address and an IPv4 multicast source address, and a second pair of the allocated transport network IPv6 multicast address and an IPv6 multicast source address; and in response to receipt of MBMS data from a node configured as a Broadcast-Multicast Service Center (BM-SC), sending the MBMS data using at least one of the first and second pair of addresses.

2. The method of claim 1, wherein the sending further comprises sending the MBMS data using the first pair of addresses and sending the MBMS data using the second pair of addresses respectively.

3. The method of claim 1, wherein the sending further comprises sending the MBMS data using one pair of addresses joined by nodes configured as eNodeBs.

4. The method of claim 1, wherein the session start request message includes a Re-Auth-Request (RAR) message received from the BM-SC node.

5. The method of claim 4, wherein the RAR message includes information indicating a time to MBMS data transfer, wherein the information is set to enable both IPv4 multicast and IPv6 multicast to be established within the time.

6. The method of claim 4, further comprising allocating a User Datagram Protocol (UDP) port for incoming traffic in the session, and transmitting a Re-Auth-Answer (RAA) message including the allocated UDP port to the BM-SC node.

7. The method of claim 1, wherein the other session start request message includes a MBMS IP Multicast Distribution Information Element (IE) which carries the first and second pair of addresses.

8. A method of multicasting in a node configured as a Mobility Management Element (MME), the method comprising:

receiving a session start request message from a node configured as a Multimedia Broadcast Multicast Service (MBMS) gateway, the session start request message including a first pair of a transport network IPv4 multicast address and an IPv4 multicast source address, and a second pair of a transport network IPv6 multicast address and an IPv6 multicast source address;

generating another session start request message which includes at least one of the first and second pair of addresses; and transmitting the other session start request message to a node configured as a Multicast Coordination Entity (MCE).

9. The method of claim 8, wherein the other session start request message includes both the first and second pair of addresses.

10. The method of claim 8, wherein the other session start request message includes one pair of addresses that is supported by a radio access network of the MCE.

11. The method of claim 8, wherein the at least one of the first and second pair of addresses is carried by at least one Transport Network Layer (TNL) information.

12. A method of multicasting in a node configured as a Multicast Coordination Entity (MCE), the method comprising:

receiving a session start request message from a node configured as a Mobility Management Element (MME), the session start request message including at least one pair of a first pair of a transport network IPv4 multicast address and an IPv4 multicast source address and a second pair of a transport network IPv6 multicast address and an IPv6 multicast source address;

generating another session start request message including the at least one of the first and second pair of addresses; and transmitting the other session start request message to a node configured as an eNodeB.

13. The method of claim 12, wherein the other session start request message includes both the first and second pair of addresses.

14. The method of claim 12, wherein the other session start request message includes one pair of addresses that is supported by the eNodeB node.

15. The method of claim 12, wherein the other session start request message includes one pair of addresses to the eNodeB node, and the method further comprises:

in response to receipt of a response indicating a failure to start the session, generating a further session start request message including the other pair of addresses; and transmitting the further session start request message to the eNodeB node.

16. The method of claim 12, wherein the at least one of the first and second pair of addresses is carried by at least one Transport Network Layer (TNL) information.

17. A method of multicasting in a node configured as an eNodeB, the method comprising:

receiving a session start request message from a node configured as a Multicast Coordination Entity (MCE), the session start request message including at least one pair of a first pair of a transport network IPv4 multicast address and an IPv4 multicast source address and a second pair of a transport network IPv6 multicast address and an IPv6 multicast source address; and joining one of the at least one pair of addresses to enable reception of the MBMS data.

18. The method of claim 17, wherein the joining comprises:

if only one pair of addresses is included in the session start request message, joining the one pair of addresses.

19. The method of claim 18, wherein the joining further comprises:

if the one pair of addresses is not supported by the eNodeB node, transmitting to the MCE node a response indicating a failure to start the session; and in response to receipt of another session start request message including the other pair of addresses from the MCE node, joining the other pair of addresses.

20. The method of claim 17, wherein the joining comprises:

if both the first and second pairs of addresses are included in the session start request message, joining one pair of addresses that is supported by the eNodeB node.

21. A node configured as a Multimedia Broadcast Multicast Service (MBMS) gateway, the node comprising:

a transceiver configured to receive a session start request message for a multicast session;

a multicast controlling unit configured to:
  in response to receipt of the session start request message, allocate a transport network IPv4 multicast address and a transport network IPv6 multicast address for the session;
  generate another session start request message, wherein the other session start request message includes a first pair of the allocated transport network IPv4 multicast address and an IPv4 multicast source address, and a second pair of the allocated transport network IPv6 multicast address and an IPv6 multicast source address; and the transceiver being further configured to:
    transmit the other session start request message to a node configured as a Mobility Management Element (MME); and
    in response to receipt of MBMS data from a node configured as a Broadcast-Multicast Service Center (BM-SC), send the MBMS data using at least one of the first and second pair of addresses.

22. The node of claim 21, wherein the transceiver is further configured to send the MBMS data using the first pair of addresses and send the MBMS data using the second pair of addresses respectively.

23. The node of claim 21, wherein the transceiver is further configured to send the MBMS data using one pair of addresses joined by nodes configured as eNodeBs.

24. The node of claim 21, wherein the session start request message includes a Re-Auth-Request (RAR) message received from the BM-SC node.

25. The node of claim 24, wherein the RAR message includes information indicating a time to MBMS data transfer, wherein the information is set to enable both Ipv4 multicast and Ipv6 multicast to be established within the time.

26. The node of claim 24, wherein the multicast controlling unit is further configured to allocate a User Datagram Protocol (UDP) port for incoming traffic in the session, and transmit a Re-Auth-Answer (RAA) message including the allocated UDP port to the BM-SC node.

27. The node of claim 21, wherein the other session start request message includes a MBMS IP Multicast Distribution Information Element (IE) which carries the first and second pair of addresses.

28. A node configured as a Mobility Management Element (MME), the node comprising:
    a transceiver configured to receive a session start request message from a node configured as a Multimedia Broadcast Multicast Service (MBMS) gateway, the session start request message including a first pair of a transport network Ipv4 multicast address and an IPv4 multicast source address, and a second pair of a transport network Ipv6 multicast address and an Ipv6 multicast source address;
    a multicast controlling unit configured to generate another session start request message which includes at least one of the first and second pair of addresses; and
    the transceiver being further configured to transmit the other session start request message to a node configured as a Multicast Coordination Entity (MCE).

29. The node of claim 28, wherein the other session start request message includes both the first and second pair of addresses.

30. The node of claim 28, wherein the other session start request message includes one pair of addresses that is supported by a radio access network of the MCE.

31. The node of claim 28, wherein the at least one of the first and second pair of addresses is carried by at least one Transport Network Layer (TNL) information.

32. A node configured as a Multicast Coordination Entity (MCE), the node comprising:
    a transceiver configured to receive a session start request message from a node configured as a Mobility Management Element (MME), the session start request message including at least one pair of a first pair of a transport network Ipv4 multicast address and an IPv4 multicast source address and a second pair of a transport network IPv6 multicast address and an IPv6 multicast source address;
    a multicast controlling unit configured to generate another session start request message including the at least one of the first and second pair of addresses; and
    the transceiver being further configured to transmit the other session start request message to a node configured as an eNodeB.

33. The node of claim 32, wherein the other session start request message includes both the first and second pair of addresses.

34. The node of claim 32, wherein the other session start request message includes one pair of addresses that is supported by the eNodeB node.

35. The node of claim 32, wherein the other session start request message includes one pair of addresses;
    the multicast controlling unit is further configured to in response to the transceiver receiving a response indicating a failure to start the session, generate a further session start request message including the other pair of addresses; and
    the transceiver is further configured to transmit the further session start request message to the eNodeB node.

36. The node of claim 32, wherein the at least one of the first and second pair of addresses is carried by at least one Transport Network Layer (TNL) information.

37. A node configured as an eNodeB, the node comprising:
    a transceiver configured to receive a session start request message from a node configured as a Multicast Coordination Entity (MCE), wherein the session start request message includes at least one pair of a first pair of a transport network IPv4 multicast address and an IPv4 multicast source address and a second pair of a transport network IPv6 multicast address and an IPv6 multicast source address; and
    a multicast controlling unit configured to join one of the at least one pair of addresses to enable reception of the MBMS data.

38. The node of claim 37, wherein the multicast controlling unit is further configured to:
    if only one pair of addresses is included in the session start request message, join the one pair of addresses.

39. The node of claim 37, wherein the transceiver is further configured to:
    if the one pair of addresses is not supported by the eNodeB node, transmit to the MCE node a response indicating a failure to start the session;
    receive another session start request message including the other pair of addresses from the MCE node; and
    the multicast controlling unit is further configured to, in response to receipt of the other session start request message, join the other pair of addresses.

40. The node of claim 37, wherein the multicast controlling unit is further configured to:
    if both the first and second pairs of addresses are included in the session start request message, join one pair of addresses that is supported by the eNodeB node.

* * * * *